UNITED STATES PATENT OFFICE.

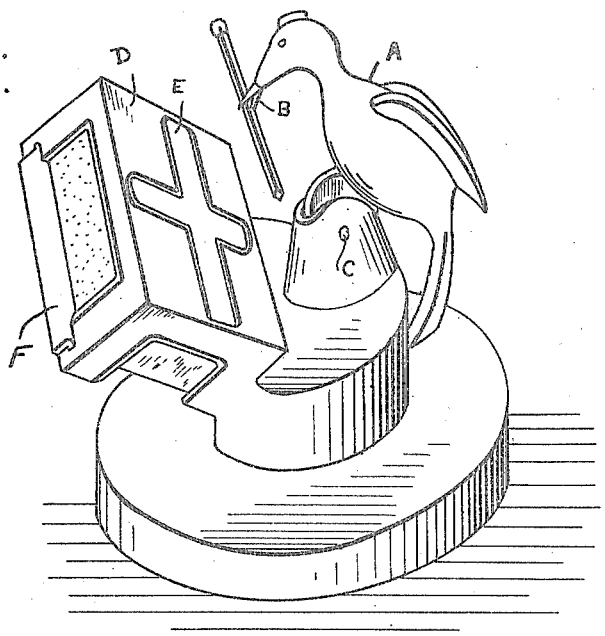
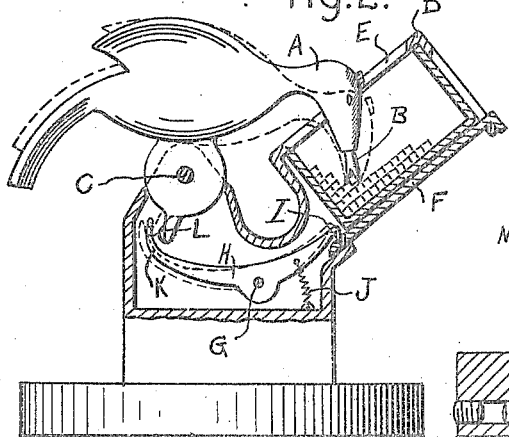
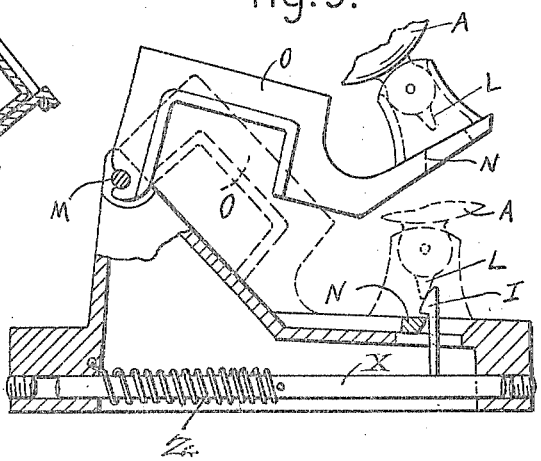

OLAF STOKKAN, OF VEMORK, RJUKAN, NORWAY.

HOLDER FOR MATCHES OR MATCH-BOXES.

1,291,231.   Specification of Letters Patent.   Patented Jan. 14, 1919.

Application filed September 18, 1918. Serial No. 254,668.

*To all whom it may concern:*

Be it known that I, OLAF STOKKAN, of Vemork, Rjukan, in the Kingdom of Norway, have invented certain new and useful Improvements in Holders for Matches or Match-Boxes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object to provide a holder for matches or match boxes of such a construction that only one match may be taken out at a time, this being realized in the manner that by the movement of an arm provided with one or more needle-shaped points one or two matches are spit and then lifted up from the space containing them. The lifting of the matches out from the box takes place through a comparatively narrow slot, and the box may be so arranged or locked fast that it as a whole cannot be removed till all matches have been taken out.

The drawings illustrate two constructional forms of the invention.

Figure 1 is a perspective view of a device embodying the invention, and showing a match lifted from the box; Fig. 2 is a sectional view of the said construction showing the match removing device engaging a match; Fig. 3 is a fragmentary and partially sectional view of the lower part of another construction embodying the invention, and with the cover lifted to remove or insert a match box.

Referring to Figs. 1 and 2, the box is shown as being combined with a locking mechanism, which is released only, when the last match is being taken out or has been taken out. In the example shown the arm carrying the needle-shaped point or points spitting the matches is formed like a bird A the beak of which forms two spitting points B. The bird is pivotally mounted about a horizontal pin C, and its center of gavity is so situated that the arm occupies normally the position shown in Fig. 1 of the drawing. After the upper half of the box has been removed, the striking-plane being however retained, the match box is placed within a box-shaped frame D having a cross-shaped slot E affording passage for the bird head during its diving down into the box space to fetch a match and during the movement of the match out from the box. The frame holding the box is placed at an inclined position so that the matches according as their number is decreased tend by their own gravity to roll down into one box corner located in the arc described by the bird beak during the tilting of the bird. The box is put into the holder preferably from below, a slidable bottom plate, which may be locked fast in some manner, preventing the box from being removed by everybody.

In the constructional form illustrated in Fig. 2 this slidable bottom plate F is held fast by a locking device combined in such a manner with a lug projecting down from the pivoted arm (the bird) that the latter, when the bird is tilted so much that the points are passed through the box corner after the last match has been taken out, causes the releasing of the locking mechanism. The locking mechanism is constituted by a lever H pivoted at G and provided with a hook I, which by a spring J is maintained in engagement with a recess made in the bottom plate F. The lever has a tail K which is pressed down by the lug L, when the bird dives down after the last match has been taken out from the box. Thereby the bottom plate is released, so that the box may be removed and replaced by a new one.

Fig. 3 shows another constructional form of the locking mechanism.

Here the whole upper part O of the device is pivoted about a pin M. When the points B (the beak of the bird) are forced through one corner of the box or are taking out the last match, the lug *l* presses back a hook I, carried by a rod X which is normally held in the position shown by a spring Z, whereby the corresponding engaging edge N of the part O is released and the part O may be turned about the pin M and be totally removed. The emptied box may then be removed and a new one placed in position.

I claim:

1. In combination, a holder formed to support a match-container, means for locking the holder in a desired position, a movable arm having a match-spitting means to remove matches individually from the container, and means, controlled by the arm, for releasing the locking means when all matches have been removed from the container.

2. In combination, means for locking a match-container in a desired position, a device for removing the matches individually from said container, and means, controlled by said device, for releasing the match-container when all matches have been removed therefrom.

3. In combination, means for locking a match-container in a desired position, a movable arm having means to enter the container and to remove matches, individually, therefrom, and means, operable upon an extreme movement of the arm, for releasing the match-container.

4. In a match holder, the combination of a match container, a top plate covering the container and forming part of a box-like holder for an inclined match box, a slot formed in said plate, a pivoted arm provided with one or more sharp points and arranged in such a relation to the container that the end of the arm when tilted may pass through the slot and thereby spit a match and remove it by means of its points, a locking mechanism for the covering plate, and means connected with the pivoted arm in such a manner as to effect the releasing of the locking mechanism only in case the points remove the last match lying in the lowermost box corner or in case said points are passed through said corner after the last match has been removed.

5. In a match holder, the combination of a match container, a top cover covering the container and forming part of a box-like holder for an inclined match box, a slot formed in said cover, a pointed arm provided with one or more sharp points and arranged in such a relation to the container that the end of the arm when tilted may pass through the slot and thereby spit a match and remove it by means of its points, a springy or spring-actuated hook locking the cover to the bottom part of the match holder, a lug forming part of the pivoted arm and arranged in such a position as to effect the releasing of said hook only in case the points remove the last match lying in the lowermost box corner or in case said points are passed through said corner after the last match has been removed.

In testimony that I claim the foregoing as my invention, I have signed my name in presence of two subscribing witnesses.

OLAF STOKKAN.

Witnesses:
 HALVOR OLSEN.
 MOGENS BUGGE.

Copies of this patent may be obtained for five cents each, by addressing the "Commissioner of Patents, Washington, D. C."